3,478,024
DI-(HYDROXYNAPHTHYL)-TRIAZINES
Hans Altermatt, Reinach, Basel-Land, Switzerland, assignor to Ciba Limited, Basel, Switzerland, a company of Switzerland
No Drawing. Filed Jan. 25, 1967, Ser. No. 611,568
Claims priority, application Switzerland, Feb. 1, 1966, 1,398/66; Dec. 19, 1966, 18,126/66
Int. Cl. C07d 55/50; C08k 1/52; C09b 17/04
U.S. Cl. 260—248    4 Claims

ABSTRACT OF THE DISCLOSURE

The present invention concerns dyestuffs which are characterized by a 1,3,5-triazine ring which is substituted in 2-position by an alkyl, cycloalkyl, aralkyl, heterocyclic or aryl residue which, in so far as it is a benzene or a naphthalene residue, must not contain a hydroxyl group in para-position to the triazine residue, which triazine ring is substituted in each of the 4- and 6-positions by a β-hydroxynaphthylene radical bound in α-position to the triazine radical.

The new dyes are useful for the melt-coloration in fast yellow shades of spinnable, high-molecular products, for example polyolefines, polyesters, and especially polyamides.

---

The present invention is based on the observation that di-(hydroxynaphthyl)-triazines of the formula

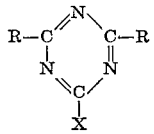

in which R represents a naphthalene residue bound to the triazine ring in 1-position, which residue contains a hydroxyl group in 2-position and which may contain other substituents an alkyl, cycloalkyl, aralkyl, heterocyclic or aryl residue which, in so far as it is a benzene or a naphthalene residue, must not contain a hydroxyl group in para-position to the triazine residue, but may otherwise contain any other substituents, are obtainable when a dihalogenated triazine of the formula

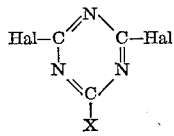

is condensed in a molar ratio of 1:2 in the presence of a Friedel-Crafts catalyst with a 2-hydroxynaphthalene which may be further substituted, except in 1-position, or when a trihalogenated 1,3,5-triazine is condensed in a molar ratio of 1:2:1 in the presence of a Friedel-Crafts catalyst with a 2-hydroxynaphthalene and an aryl compound free from hydroxy groups in α-position.

The starting materials which may be used are, for example, methyl-, cyclopentyl- or cyclohexyl-dichlorotriazine, benzyldichlorotriazine, furyl-, thienyl- or pyridyldichlorotriazine or especially aryldichlorotriazines, the aryl residue being, for example, a benzene, naphthalene, acenaphthene, phenanthrene, anthracene, pyrene or perylene residue. The benzene and naphthalene residues, in particular, may contain substituents, for example, in para-position to the triazine residue, such substituents being, for example, halogen atoms or alkyl, alkoxy, alkylmercapto, phenoxy, phenylmercapto, phenyl or phenylalkyl groups.

The preferred 2-hydroxynaphthalene is unsubstituted β-naphthol. However, mention may also be made of 2-hydroxynaphthalenes substituted in a position other than 1-position, for example, 2-hydroxy-6-chloro- or 6-bromo-naphthalene, 2-hydroxy-4-methylnaphthalene or 2,7-dihydroxynaphthalene.

The aryl compounds which may be used are, for example, naphthalene, β-naphthol, acenaphthene, phenanthrene, anthracene, pyrene, perylene or substituted benzenes, for example, toluene, meta-xylene, chlorobenzene or anisole.

The Friedel-Crafts catalyst used is preferably aluminium chloride, the amount used being advantageously 1 mol per mol of the residue to be introduced into the triazine residue.

The reaction is preferably carried out in the presence of an inert organic solvent, for example, carbon disulphide, benzene, a halogenated benzene, for example, chlorobenzene, ortho-dichlorobenzene or trichlorobenzene, or a halogenated alkane, especially tetrachloroethane, advantageously at an elevated temperature and with stirring.

Working up is advantageously effected by discharging the reaction mixture into dilute hydrochloric acid. The solvent is advantageously removed by extraction or steam distillation. Since the products are obtained in an extremely pure state, further purification, for example, by recrystallization, is generally unnecessary.

The di-(hydroxynaphthalene)-triazines obtained are valuable, greenish yellow dyestuffs which are suitable for dyeing a very wide variety of materials. By virtue of their thermal stability they are specially suitable for use in the melt-colouration of spinning compositions, for example, polyvinyl chloride, polyolefines, for example, polyethylene, polypropylene, polyesters, for example, polyethylene terephthalate, and polyamides, for example, derived from ε-caprolactam, hexamethylene diamine and adipic acid or ω-aminoundecanoic acid. Clear colourations possessing a high degree of light fastness are obtained. Furthermore, the new dyestuffs also act as heat stabilizers and UV-absorbers and possess fungicidal properties. Moreover, the tensile strength of polyamide fibres coloured with the new dyestuffs remains practically unchanged, even after a long period of use.

Apart from fluorubine, which is very difficult to obtain, there have hitherto been no organic yellow pigments available which are suitable for use in the melt-colouraton of polyamides. The yellow inorganic pigments possess low tinctorial strength, are not fast to chlorine, are often toxic, and generally produce only opaque colourations. The new colourants thus meet a long-standing need.

The polymers to be coloured are advantageously in the form of powders, grains or chips. They are coated with the dry dyestuff power; for example, they are mechanically mixed therewith in a manner such that the surface of the particles is coated with dyestuff. The dyestuff is advantageously used in a state of fine division. Specially good results are obtained by the use of dyestuff preparations consisting of a fine powder of the material to be coloured containing the dyestuff in a uniform state of dispersion. Such preparations are obtainable, for example, by the process described in Belgian patent specification No. 567,953, wherein a pigment is dispersed in a solution of a polyamide in formic acid and the pigmented polyamide is precipitated by the addition of water.

The coated polymer particles so obtained are then melted and spun or shaped in some other way, for example, made into films, by known methods. The synthetic materials may also be coloured by adding the dyestuff either prior to, during, or immediately after the polycondensation of the monomers. The coloured material so obtained is then further shaped alone like uncoloured material or together with material of another colour or with uncoloured material.

The coloured melts obtained by the process of the invention can be made into shaped structures; in particular, they can be spun into fibres. The coloured fibres so obtained have a highly valued, greenish yellow tint of good brilliance and possessing an excellent fastness to light and to wet processing.

Compared with the di- and tri-(hydroxynaphthyl)triazines described in United States patent specification No. 1,566,742, the dyestuffs obtainable by the process of the present invention have the advantage of conferring better fastness to light and better properties of wet fastness to the coloured fibres.

The following examples illustrate the invention. Unless otherwise stated, the parts and percentages are by weight.

EXAMPLE 1

72 parts of β-naphthol and 31 parts of cyanuric chloride are mixed with 500 parts by volume of tetrachloroethane. 67 parts of powdered aluminium chloride are added and the reaction mixture is stirred for 4 hours at 140 to 145° C. After cooling the reaction mixture, dilute hydrochloric acid is added and the solvent is removed by steam distillation. The residue is extracted with 4 N sodium hydroxide solution, the extract is precipitated with dilute hydrochloric acid, and the yellow precipitate is isolated by filtration. It is then washed until the washings run neutral and dried. About 80 parts of the yellow dyestuff of the formula

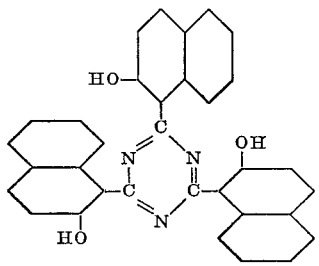

are obtained.

The dyestuff colours nylon 6 yellow tints when applied by the coating process.

EXAMPLE 2

57.6 parts of β-naphthol are mixed with 45.2 parts of 2-phenyl-4,6-dichloro-1,3,5-triazine in 600 parts by volume of tetrachloroethane. 53 parts of aluminium chloride are added and the batch is stirred for 4 hours at 140 to 145° C. Working up is carried out in the customary manner and a yellow-olive dyestuff is obtained in almost quantitative yield. When recrystallized from chloroform, the dyestuff of the formula

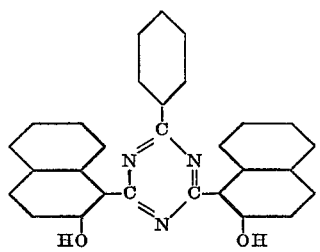

is a lemon yellow powder which colours nylon 66 yellow tints by the grid-spinning process.

EXAMPLE 3

The yellow compound of the formula

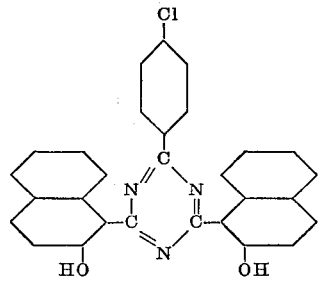

is obtained when the 45.2 parts of 2-phenyl-4,6-dichloro-1,3,5-triazine used in Example 2 are replaced by 52.1 parts of 2 - (para-chlorophenyl)-4,6-dichloro-1,3,5-triazine. The dyestuff dyes nylon 66 yellow tints possessing a very good fastness to light when applied in the manner described in Example 13.

EXAMPLE 4

A yellow dystuff having a similar constitution and dyeing properties is obtained when the 45.2 parts of 2-phenyl-4,6-dichloro-1,3,5-triazine used in Example 2 are replaced by 70.2 parts of 2-pyrenyl-4,6-dichloro-1,3,5-triazine (prepared according to Example 1 of United States patent specification No. 2,232,871) or by 80 parts of 2-perylenyl-4,6-dichloro-1,3,5-triazine (prepared according to Example 4 of United States patent specification No. 2,232,871) or by 75.2 parts of 2-chrysenyl-4,6-dichloro-1,3,5-triazine or by 70 parts of 2-fluoroanthenyl-4,6-dichloro-1,3,5-triazine or by 65.2 parts of 2-anthracenyl-4,6-dichloro-1,3,5-triazine or by 65.2 parts of 2-phenanthrenyl-4,6-dichloro-1,3,5-triazine.

EXAMPLE 5

23.2 parts of 2-thienyl-(2')-4,6-dichloro-1,3,5-triazine (prepared according to published German patent application No. 1,215,713) and 30.3 parts of β-naphthol are mixed at room temperature in 400 parts by volume of tetrachloroethane. 29.4 parts of aluminium chloride are added during 5 minutes, whereby the temperature rises from 18° C. to 30° C. The batch is stirred for 5 hours at 80 to 85° C., cooled to 20° C., poured on to ice, and the tetrachloroethane is removed by steam distillation. The yellow residue is rendered alkaline, filtered, the filter residue is washed until the washings run neutral and then recrystallized from toluene. The yellow dyestuff of the formula

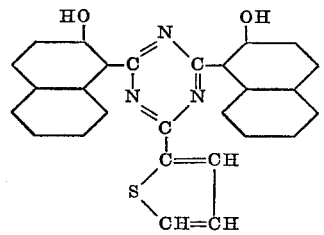

colours polyamide yellow tints when applied in the manner described in Example 13.

The yellow dyestuff of the formula

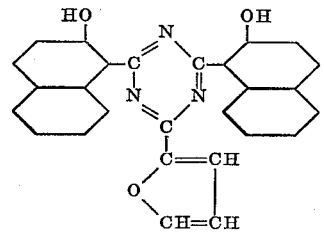

which has similar dyeing properties, is obtained when the 23.2 parts of 2-thienyl-(2')-4,6-dichloro-1,3,5-triazine are replaced by 21.6 parts of 2-furyl-(2')-4,6-dichloro-1,3,5-triazine.

EXAMPLE 6

29 parts of 4-(2',4'-dichloro-1',3',5'-triazin-6'-yl) - 1-methylnaphthalene (prepared according to Example 1 of British patent specification No. 1,001,713) and 28.8 parts of β-naphthol are mixed at room temperature in 400 parts by volume of tetrachloroethane. 27 parts of aluminium chloride are added during 5 minutes, whereby the temperature rises from 20° C. to 30° C. The batch is stirred for 4 hours under reflux. After working up in the usual manner and recrystallization from toluene, the yellow dyestuff of the formula

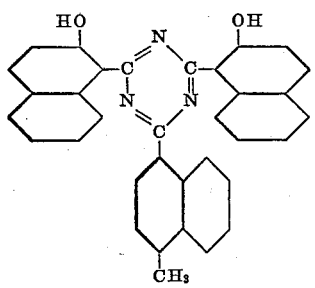

is obtained.

A yellow dyestuff having a similar constitution is obtained by using a corresponding amount of 1-(2',4'-dichloro-1',3',5'-triazin-6'-yl)-2,6-dimethylnaphthalene.

The dyestuffs so obtained colour polyester yellow tints when applied in the manner described in Example 14.

EXAMPLE 7

26.5 parts of 5-(2',4'-dichloro-1',3',5'-triazin-6' - yl)-acenaphthene and 25.3 parts of β-naphthol are mixed at room temperature in 400 parts by volume of tetrachloroethane. 24 parts of aluminium chloride are added, the batch is heated to 85° C. and then stirred at that temperature for 4 hours. After working up in the customary manner, the yellow dyestuff of the formula

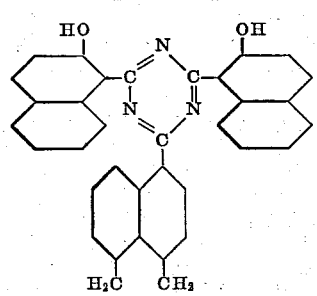

is obtained.

When applied in the manner described in Example 15, the dyestuff colours, for example, polypropylene yellow tints possessing a good fastness to light and to wet processing.

EXAMPLE 8

15.8 parts of 1-methoxynaphthalene are mixed at room temperature with 18.5 parts of cyanuric chloride in 75 parts by volume of benzene. 13.4 parts of aluminium chloride are introduced during 20 minutes and the suspension is stirred for 16 hours at 20 to 25° C. The suspension is then discharged into 120 parts by volume of methanol at 0 to 10° C. and the precipitate is isolated by filtration and washed with a small amount of methanol. The residue is discharged into cold, dilute hydrochloric acid, filtered, washed until the washings run neutral and then dried.

30 parts of the triazine derivative so obtained are mixed with 28.8 parts of β-naphthol in 500 parts by volume of benzene until dissolution occurs. 27 parts of aluminium chloride are added during 20 minutes and the dark red reaction mixture is stirred for 15 hours at 20 to 25° C. It is then discharged into 1,500 parts by volume of methanol, filtered, and the filter residue is stirred in cold, dilute hydrochloric acid. The yellow precipitate is isolated by filtration, washed, and then dried. The yellow dyestuff of the formula

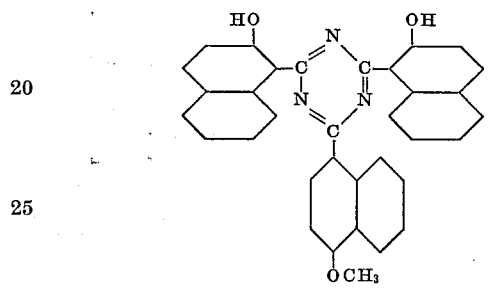

melts at 280 to 281° C.

EXAMPLE 9

22.6 parts of 2-phenyl-4,6-dichloro-1,3,5-triazine are mixed with 33.6 parts of 2,7-dihydroxynaphthalene in 600 parts by volume of tetrachloroethane. 30 parts of aluminium chloride are added and the batch is heated to 140° C. and stirred for 3 hours under reflux. The dyestuff of the formula

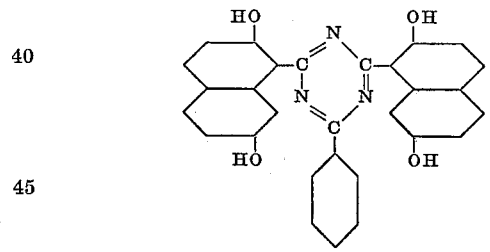

obtained after the usual working up process crystallizes from nitrobenzene in the form of small yellow needles.

A yellow dyestuff of the formula

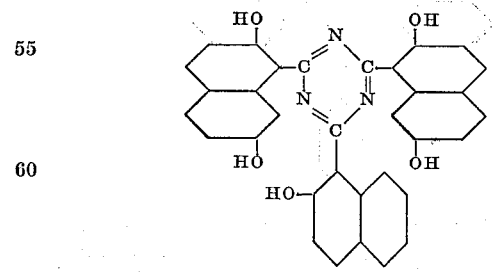

is obtained by replacing the 22.6 parts of triazine by 29.2 parts of 2-(2'-hydroxynaphthyl-1'-)4,6-dichloro-1,3,5-triazine.

These dyestuffs colour polyamide yellow tints when applied in the manner described in Example 13.

EXAMPLE 10

23.2 parts of 2-cyclohexyl-4,6-dichloro-1,3,5-triazine, 30.2 parts of β-naphthol and 30 parts of aluminium chloride are mixed for 4 hours at 80° C. in 600 parts by volume of tetrachloroethane. After the usual working up process, the yellow dyestuff of the formula

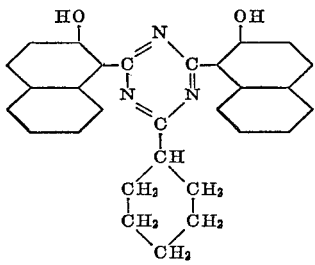

can be isolated. It produces a colouration possessing a good fastness to light and to wet processing when applied in the manner described in Example 13.

EXAMPLE 11

18.5 parts of cyanuric chloride, 20.2 parts of pyrene and 15 parts of aluminium chloride are mixed for 17 hours at 20 to 25° C. in 200 parts by volume of tetrachloroethane. 30 parts of β-naphthol, 27 parts of aluminium chloride and 100 parts by volume of tetrachloroethane are added and the batch is then stirred for 4 hours at 140° C. The dyestuff isolated after the usual working up process corresponds in all respetcs to the dyestuff described in Example 4.

EXAMPLE 12

16.4 parts of 2-methyl-4,6-dichloro-1,3,5-triazine and 30 parts of β-naphthol are dissolved at room temperature in 500 parts by volume of tetrachloroethane. 28 parts of aluminium chloride are added to the solution, and the temperature rises to 30° C. The dark reaction solution is heated to 80° C. and stirred at that temperature for 4 hours. After the usual working up process, 37 parts of the yellow dyestuff of the formula

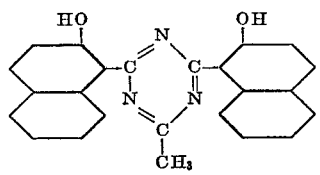

are obtained.

The yellow dyestuffs of the formula

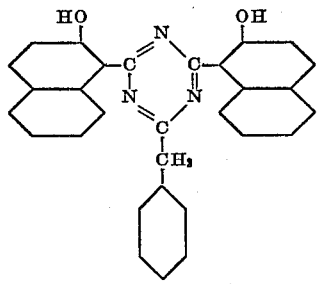

is obtained when the methyldichlorotriazine is replaced by 24 parts of 2-benzyl-4,6-dichloro-1,3,5-triazine. These dyestuffs produce yellow colourations possessing a good fastness to light and to wet processing when applied according to Example 14.

EXAMPLE 13

100 parts of a polyamide which has been produced in known manner from caprolactam are mixed in the form of chips with 1 part of a dyestuff obtained as described in Examples 1 to 4 in a rotating vessel. The coated chips are then spun by the melt spinning process usually employed for polyamide 6. The yellow polyamide filaments so obtained display a very good fastness to light.

EXAMPLE 14

100 parts of a polyethylene terephthalate which has been produced in known manner from terephthalic acid and glycol, are coated in the form of chips with 1 part of the dyestuff of Example 2. The chips are then spun into filaments in the usual manner at about 270° C. The polyester fibres so obtained display good properties of fastness.

EXAMPLE 15

100 parts of polypropylene chips ("Moplen") are mixed with 1 part of the dyestuff of Example 3. The coated chips are then spun into filaments under normal conditions by the melt-spinning process. The yellow filaments so obtained display very good properties of fastness.

EXAMPLE 16

A paste comprising 100 parts of polyvinyl chloride, 50 parts by volume of dioctylphthalate and 0.3 part of the dyestuff obtained in the manner described in Example 1 is rolled into a film on a roller mill at a temperature of 150 to 155° C. The yellow polyvinyl chloride film so obtained displays a good fastness to light.

I claim:

1. A di-(hydroxynaphthyl)-triazine of the formula

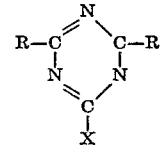

in which R represents a naphthalene residue bound to the triazine ring in the 1-position, which residue contains a hydroxyl group in the 2-position, and which may also be substituted with a member selected from the group consisting of chloro, bromo, methyl and hydroxy and X is selected from the group consisting of lower alkyl, cyclohexyl, phenalkyl, thienyl, furyl, monocyclic carbocyclic aryl and 2–5 ring polycyclic, carboxylic aryl having 10–20 ring carbon atoms; which aryl radicals may be substituted with a group selected from the group consisting of halo, hydroxy, lower alkyl and lower alkoxy, but must be free from hydroxy in the para position if the aryl radicals are benzene and naphthalene.

2. A di-(hydroxynaphthyl)-triazine as claimed in claim 1 corresponding to the formula

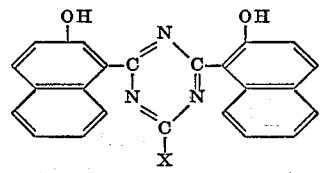

in which X is a member selected from the group consisting of a lower alkyl, phenalkyl, cyclohexyl, thienyl, furyl and aryl radicals comprising 1 to 4 benzene nuclei which aryl radicals may be substituted by halogen atoms, hydroxy, lower alkyl and lower alkoxy groups but must be free from hydroxy groups in para-position if the aryl radicals are benzene and naphthalene radicals.

3. The dyestuff as claimed in claim 1 and corresponding to the formula

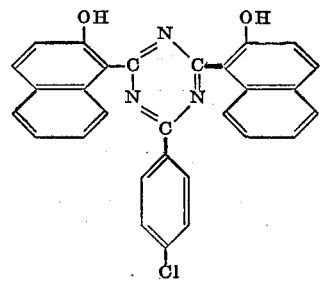

4. The dyestuff as claimed in claim 1, and corresponding to the formula
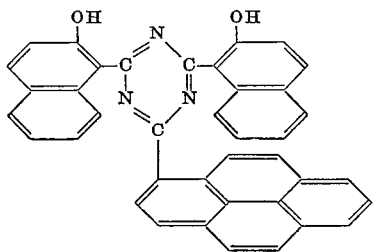
References Cited
UNITED STATES PATENTS
1,566,742  12/1925  Fritzsche et al. _____ 260—248
3,111,518  11/1963  Moergeli _____ 260—248
HENRY R. JILES, Primary Examiner
JOHN M. FORD, Assistant Examiner
U.S. Cl. X.R.
8—4, 55; 252—300; 260—999